United States Patent
Barbir (10) Patent No.: US 8,931,064 B2
(45) Date of Patent: Jan. 6, 2015

(54) IDENTITY ATTRIBUTE EXCHANGE AND VALIDATION ECOSYSTEM

(71) Applicant: Bank of America Corporation, Charlotte, NC (US)

(72) Inventor: Abdulkader Barbir, Ontario (CA)

(73) Assignee: Bank of America Corporation, Charlotte, NC (US)

( * ) Notice: Subject to any disclaimer, the term of this patent is extended or adjusted under 35 U.S.C. 154(b) by 77 days.

(21) Appl. No.: 13/718,522

(22) Filed: Dec. 18, 2012

(65) Prior Publication Data

US 2014/0173697 A1   Jun. 19, 2014

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06F 12/00 | (2006.01) | |
| G06F 12/14 | (2006.01) | |
| G06F 13/00 | (2006.01) | |
| G11C 7/00 | (2006.01) | |

(52) U.S. Cl.
CPC ........... *H04L 63/0815* (2013.01); *H04L 63/102* (2013.01)
USPC .................................................. 726/4; 726/21

(58) Field of Classification Search
CPC ...... H04L 63/08; H04L 63/0884; H04L 63/10
USPC ...................................................... 726/4, 21
See application file for complete search history.

(56) References Cited

U.S. PATENT DOCUMENTS

| | | | |
|---|---|---|---|
| 2004/0128393 A1 | 7/2004 | Blakley et al. | |
| 2006/0048216 A1* | 3/2006 | Hinton et al. | 726/8 |
| 2006/0218625 A1* | 9/2006 | Pearson et al. | 726/4 |
| 2008/0021866 A1 | 1/2008 | Hinton et al. | |
| 2008/0021997 A1 | 1/2008 | Hinton | |
| 2008/0046984 A1 | 2/2008 | Bohmer et al. | |
| 2009/0141707 A1 | 6/2009 | Kavanaugh | |
| 2012/0311663 A1* | 12/2012 | Seidl et al. | 726/1 |
| 2014/0068722 A1* | 3/2014 | Hayat | 726/4 |

OTHER PUBLICATIONS

OpenID Connect Messages 1.0—draft 05 Arcived: Oct. 11, 2011 https://web.archive.org/web/20111011144555/http://openid.net/specs/openid-connect-messages-1_0.html.*

ITU-T Recommendation X.1254 | International Standard ISO/IEC DIS 29115 Information technology—Security techniques—Entity authentication assurance framework Dec. 2011.*

Chadwick, David W. et al., The Trusted Attribute Aggregation Service (TAAS), May 21, 2011, pp. 1-24, University of Kent.

* cited by examiner

*Primary Examiner* — Kambiz Zand
*Assistant Examiner* — Benjamin Kaplan
(74) *Attorney, Agent, or Firm* — Banner & Witcoff, Ltd.; Michael A. Springs (57) ABSTRACT

Methods and systems are described herein for performing attribute authentication for use by a relying party in providing access to a resource as requested by a user. Attribute authentication may be performed entirely by a single identity service provider, or by multiple identity service providers each authenticating a subset of a plurality of user attributes, such as name, address, phone, email, and the like. Each attribute may be authenticated with a level of assurance. Levels of assurance may vary from attribute to attribute. Different levels of assurance may be required for different attributes before the relying party may grant access to the user-desired resource. An authentication broker may act as a registry or broker of identity service providers, and may store information usable by relying parties to establish a trust relationship with a particular identity service provider on demand, as needed by a relying party.

21 Claims, 5 Drawing Sheets

IDENTITY ATTRIBUTE EXCHANGE AND VALIDATION ECOSYSTEM

BACKGROUND

Every day new websites launch offering services which tie together functionality from other sites. A photo lab printing your online photos, a social network using your address book to look for friends, and APIs to build your own desktop application version of a popular site. These are all useful services—what is not so useful about some of the implementations is their request for your username and password to the other site. When you agree to share your secret credentials, you not only expose your password to someone else (yes, that same password you may also use for online banking), you also give them full access to do as they wish. They can do anything they wanted—even change your password and lock you out.

Open authorization, or OAuth, is an open standard for authorization. OAuth allows users to share private resources (e.g., photos, videos, contact lists, access to web sites) stored on one site with a second site without having to hand out login credentials, typically supplying username and password tokens instead. Each token grants access to a specific site (e.g., a video editing site, a microblogging service, or a social network, to name a new) for specific resources (e.g., just videos from a specific album) and for a defined duration (e.g., the next 2 hours). This allows a user to grant a third party access to the user's information stored with another service provider, without sharing the user's access permissions or the full extent of the user's data or access features.

OAuth has been analogized to a valet key provided with a luxury car. The valet key is a special key one may give a parking attendant and, unlike your regular key, will not allow the car to drive more than a mile or two. Some valet keys will not open the trunk, while others will block access to your onboard cell phone address book. Regardless of what restrictions the valet key imposes, the idea is clear: you give someone limited access to your car with a special key, while using your regular key to unlock everything.

The lockout problem is one problem that open authentication services attempt to solve. They allow a user to grant access to his or her private resources on one site (which is called the Service Provider), to another site (called the Consumer or Relying Party, not to be confused with the User). While OpenID is provides a single identity to sign into many sites, OAuth is provides access to your stuff without sharing your identity at all (or its secret parts).

In current identity ecosystems, a relying party (RP), e.g., the web site storing resources being accessed by the second site, sets a policy that allows a requester (e.g., a user, another RP, the third party web site accessing the secured resources) access to a resource controlled by the RP based on a set of authenticated user attributes (e.g., username, address, age, and the like). The resource to be accessed may be, for instance, protected data, a particular computing device, an account, a transaction, or a computing function. For a user to access the RP-protected resource, an identity service provider (IDsP, sometimes also referred to as an IdP or IDP) that is acceptable to the RP will try to match the set of attributes in the form of a credential that can be signed, and the IDsP will present the credential to the user. The user, in turn, can provide the credential to the RP. An example of such an ecosystem is discussed in the paper published in April 2011 by the White House entitled, "National Strategy for Trusted Identities in Cyberspace."

In current identity ecosystems, the universe of possible identity attributes may be very large, and no single IDsP stores all of the needed attributes (e.g., address, phone number, birthdate, and the like) that RPs may demand at any given time. In addition, a given IDsP might not be the authoritative source for asserting a particular attribute about a user. For example, while a financial institution such as a bank may be a reliable source to assert a first attribute (e.g., an address) of a particular user, the financial institution may not be the most reliable source to assert a second attribute (e.g., a list of allergies to medications) of the user. Furthermore, current identity management systems typically fail to differentiate on the trust value as to how an attribute was originally obtained by the IDsP versus the authentication methodology in which that attribute is provided to an RP. For example, an attribute about a user's address asserted by a financial institution may likely be trusted more by an RP as compared with an assertion by an identity provider that performs no identity proofing when originally acquiring the user's address. In addition, a relying party can only rely on a single IDsP at a time, and that IDsP may not be able to authenticate or provide all necessary attributes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Methods and systems are described herein for performing attribute authentication for use by a relying party in providing access to a resource as requested by a user. Attribute authentication may be performed entirely by a single identity service provider, or by multiple identity service providers each authenticating a subset of a plurality of user attributes, such as name, address, phone, email, and the like. Each attribute may be authenticated with a level of assurance. Levels of assurance may vary from attribute to attribute. Different levels of assurance may be required for different attributes before the relying party may grant access to the user-desired resource. An authentication broker may act as a registry or broker of identity service providers, and may store information usable by relying parties to establish a trust relationship with a particular identity service provider on demand, as needed by a relying party.

According to aspects described herein, a replying party (RP) may rely on a policy in an identity ecosystem, where the policy defines access to resources of the relying party so as to be able to verify needed attributes at desired authentication assurance levels before granting access to the resource. The replying party may rely on one or more identity service providers (IDPs) in order to authenticate the one or more needed attributes at predefined levels of authentication. To provide this and/or other capabilities, an identity ecosystem may be provided in which attribute providers (APs) may validate attributes and relying parties (RPs) may aggregate those attributes from single or multiple sources before providing access to a resource. An Identity Service Provider is a special type of Attribute Provider able to authenticate not only attributes, but also can authenticate a user's identity. Privacy and security features may be built into the identity ecosystem through trust and security agreements. Privacy may be potentially enhanced, because the user may be able to specify which, and/or under what conditions, attributes are to be provided by which AP. The identity ecosystem may be arranged such that the RP is the responsible entity for authorizing a transaction, and may provide features for reducing fraud and for defining which entities are liable for which aspects of online transactions. This may be accomplished by, for instance, providing RPs with the ability to enhance trust in a transaction via the ability to validate attributes at various desired levels of assurance (LOAs) from different sources. For example, in such an identity ecosystem, strength of authentication itself may be treated as an attribute, and the strength of the authentication (e.g., the LOA) may be included in an RP's risk analysis in making a decision of whether to provide the requester with access to a resource. Moreover, in the identity ecosystem, each RP may be able to choose to elevate its authentication strength (e.g., the LOA).

One identity ecosystem may be compliant with, for example, the National Institute of Standards Technology (NIST) special publication 800-063m, and may be implemented using a system of computing devices that may communicate with each other via a network, and by way of one or more trust and security agreements between entities in the ecosystem that dictate how the entities are to interact with each other and/or that indicate which entities are liable for which occurrences in connection with interactions.

For instance, according to some aspects as described herein, a system, method, and/or software may be configured to receive, by a computing device of a relying party, a request from a user for access to a resource, and determine a plurality of user attributes needed to access the resource. The computer device may authenticate a first attribute of the plurality of attributes based on a level of assurance received from a computer of a first identity service provider, and may authenticate a second attribute of the plurality of attributes based on a level of assurance received from a computer of a second identity service provider. In some embodiments, the level of assurance received from the first identity service provider computer is a different level of assurance from the level of assurance received from the second identity service provider computer. In some embodiments, a decision to grant or deny access to the resource is made based on the authentication of the plurality of attributes.

According to other aspects described herein, a system, method, and/or software may be configured to receive, by a computing device of a relying party, a request from a user for access to a resource, and to determine a plurality of user attributes needed to access the resource. The computing device may query an authentication broker for identity service provider information associated with the user, and then establish, on-demand, a trust relationship with an identity service provider specified in the identity service provider information associated with the user. The computing device may also request the identity service provider to authenticate an attribute of the user, and then receive an authentication response from the identity service provider, where the authentication response includes a level of assurance associated with the user attribute. The computing device may then determine whether to grant access to the resource based at least in part on the authentication response.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

As used herein, an identity ecosystem refers to a set of relationships between 1) a user whose identity, or attributes thereof, are being authenticated; 2) an identity service provider (IDsP, IDP or IdP) authenticating the one or more attributes associated with the user; and 3) a relying party (RP) performing one or more actions in reliance on the authenticated attribute(s). Current identity ecosystems typically assume tight coupling (i.e, a contract-based trusted relationship) between an identity service provider (IdP) and a relying party (RP). For instance, in current systems (e.g., OAuth), an IdP provides an agreed-upon set of attributes to an RP. For a given session, the RP may have access to attributes from only a single IdP. The current models typically operate such that an IdP will assume the liability for incorrect information if an RP releases a protected resource to a requesting party during an online interaction in reliance on incorrect attributes supplied by the IdP. Thus, the current model normally places the transactional liability burden squarely on the IdP. The RP responsibility (and therefore liability) is typically limited to requesting the proper use of a predefined credential (a fixed collection of already agreed-upon attributes) from an IdP. This acts as a hindrance for entities to assume the role of an IdP. Such a model may also cause entities to encounter various challenges. For example, identity verification typically relies upon many disparate attributes, and a single IdP is usually not, in practice, sufficiently authoritative as to all of those attributes. This may result in at least some attributes being attested to by an IdP at a lower assurance level than desired by the RP, while the IdP is still assuming the risk associated with incorrect information. While a user may decide which IdP may be authoritative as to a given attribute, the RP may or may not trust the specific attribute at the same confidence level as the user does.

A second, link list model may be used o allow an RP to aggregate attributes from a user. However, such a model assumes that the link list is part of the trust chain, may be limited in scope to user-defined models, and may not properly scale for larger systems. Another model may be used in which the RP has one primary IdP that it always trusts for all transactions, and secondary IdPs unknown to the RP even though secondary IdPs may have trust relationships with the primary IdP and not with the RP. Thus, all attribute traffic is channeled through the primary IdP, and the primary IdP remains liable to the RP for all attributes. This model also may not properly scale and may allow the RP to unknowingly validate attributes in a manner that is outside the scope of the trust relationship with the primary IdP.

In contrast to such conventional systems, an identity ecosystem according to aspects herein may include multiple IDPs, and each IDP is liable only for its part of the transaction. For example, under such an identity ecosystem, RPs may be able rely on a trust framework that includes RPs and multiple attribute providers (e.g., multiple IdPs). This trust framework may allow some or all entities in the identity ecosystem to define attributes, liability of each party, and/or which systems are to be used to define confidence in the attributes. Such definition by the trust framework may be used as a reference point in a transaction. For example, under such a trust framework, an entity such as a bank may be certified by a certification agency such as ICAM or the Financial Services Sector Coordinating Council (FSSCC), to attest to a user's home address at a particular assurance level, such as at a particular Level of Assurance (LoA). Levels of assurance may be defined based on a particular implementation. For example, in one example, there may be four levels of assurance, with level 1 being the lowest level of confidence, and level 4 being the highest level of confidence. With such an identity ecosystem, a first RP may trust an attestation at a first assurance level, whereas a different second RP may trust the attestation at a different second assurance level, depending on how the IDP verified or obtained the attribute. Thus, RPs have the ability to trust attributes from the same source at different assurance levels. The assurance level may be based on, for example, accreditation and/or previous business experience with the attribute source. Thus, an RP may desire to conduct transactions at assurance levels that are based on context, where the assurance levels may dynamically change based on one or more factors.

As previously mentioned, a given RP may be able to aggregate attributes from more than one source as appropriate. Allowing an RP to do this may reduce the RP's liability to the requestor and/or to other entities, in that the RP may have some amount of control over the outcome by deciding on attribute sources and assurance levels. Because the RP may be liable for improperly releasing its protected resource to a requestor, an RP may define an access policy that specifies the rules and required attributes (with requisite assurance levels) that the RP needs before a resource is released. The RP may validate attributes from different attribute providers (including the user, since the user may assume the role of being an attribute provider). Moreover, in some cases, the RP may desire to validate the same attribute from multiple resources to elevate the attribute to an acceptable assurance level. For example, two attribute providers stating at LoA 1 and LoA 2, respectively, that the address of a user is correct may increase the RP's confidence in the provided user address within the particular context of an interaction, as compared with receiving the address attribute from only one of those attribute providers alone.

As an example of a use case, assume that a user wishes to perform some transaction, such as applying for a new email account via the website of an email service provider. The email service provider may offer the user the ability to logon using a strong multifactor authentication technique based on a known plural set of attribute providers (e.g., IDPs) that may be selected at least in part by the user. The user may, for instance, select a particular bank or other financial institution as the preferred attribute provider for strong authentication. The user may then log into an RP's website using his or her new email account. The RP may be another entity, such as a shopping website, bank website, video viewing service provider, and the like. When the user attempts to log in to the RP's website, the email service provider may direct the user to the preferred attribute provider previously selected by the user (in this case, the selected bank) for multi-factor authentication. The attribute provider may then provide the user and/or the RP with one or more attributes at a certain assurance level. The user may provide the attribute(s) to the RP (or this may be provided to the RP directly by the attribute provider). Based on the attribute(s), the RP may determine whether it is assured that the user is authenticated by the attribute(s) at the stated LOA.

As mentioned above, the RP may be any entity, such as a shopping website. In another example, assume that the user now wishes to apply for a loan or line of credit through the shopping website RP to purchase a certain product from the RP. The RP, in order to potentially reduce the risk of the purchase transaction, may require an endpoint (device) attestation to authenticate or confirm the physical device from which a request originates, e.g., to confirm that a request originates from a user's know mobile device. This may be done, for example, in a cookie-less fashion using endpoint security services. The RP may request dynamic information on suspected transactions on the user that could be supplied by, e.g., an early warning system. The RP may evaluate the credit-worthiness of the transaction and decide whether the RP wants to proceed based on the validated attribute(s).

Figure 1:
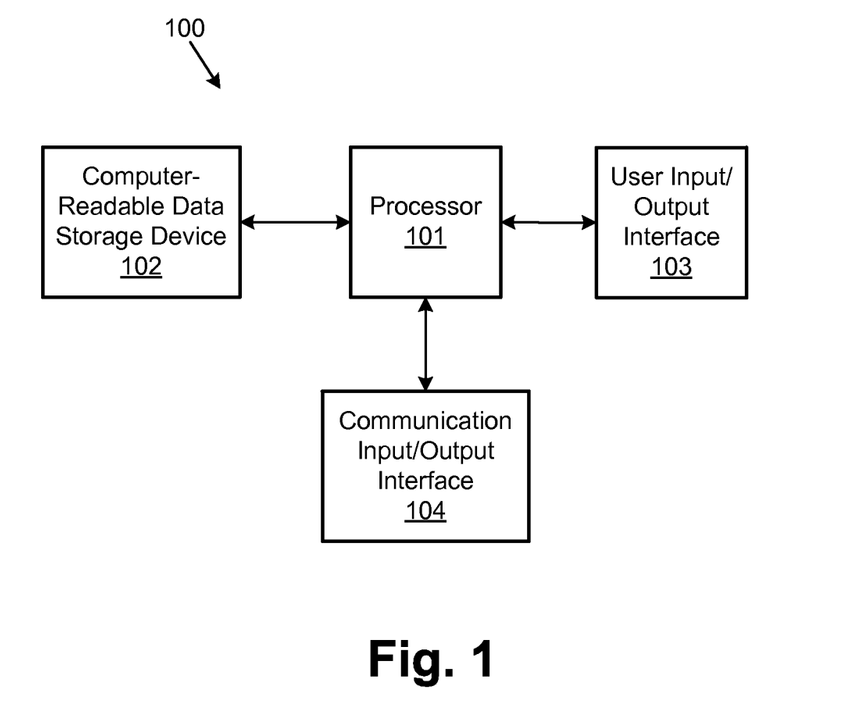
FIG. 1 is a block diagram showing an example of a computing device that may be used to implement any of the elements of the other figures.

As discussed above, the RP and/or the user may choose and decide on where each attribute is validated, and by whom. Moreover, the identity ecosystem may support and potentially ensure user privacy, because the business model may not necessarily be based on user data collection and aggregation. Stated differently, e.g., a bank that does not otherwise sell user data may act as an IDP for various attributes when authorized to do so by the user whose data the bank has collected. Attributes may be stored by different attribute providers, and the user may pick and choose which attributes are stored by whom. Thus, aspects of the proposed identity ecosystem may reduce, or even eliminate, the need for username/password authentication and allow for the use of strong authentication online Referring to the figures, FIG. 1 is a block diagram of at least a portion of an example computing device 100 that may be used to partially or fully embody any or all of the elements in any of the other figures herein. The computing device 100 may include hardware that may operate by, e.g., executing software to perform specific functions. The software, if any, may be stored by a computer-readable data storage device 102 in the form of computer-readable instructions. The computing device 100 may read those computer-readable instructions, and in response perform various steps as defined by those computer-readable instructions. Thus, any functions, steps, calculations, determinations discussed herein may be implemented by the computing device 100, such as by reading and executing computer-readable instructions for performing those functions, and/or by any hardware subsystem (e.g., a processor 101) from which the computing device 100 is composed. Additionally or alternatively, any of the above-mentioned functions may be implemented by the hardware of computing device 100, with or without the execution of software. For example, the computing device 100 may be or include one or more microprocessors, central processing units (CPUs), and/or other types of circuitry configured to perform some or all of the functions attributed to computing device 100. In such embodiments, the processor 101 may be implemented as or otherwise include the one or more microprocessors, CPUs, ASICs, and/or other types of circuitry.

A computing device may include any electronic, electro-optical, and/or mechanical device, or system of multiple physically separate or integrated such devices, that is able to process and manipulate information, such as in the form of data. Non-limiting examples of a computing device include one or more personal computers (e.g., desktop, tablet, or laptop), mainframes, servers, cellular phones (which may be "smart phones"), personal digital assistants, and/or a system of these in any combination or sub-combination. In addition, a given computing device may be physically located completely in one location or may be distributed amongst a plurality of locations (i.e., may implement distributive computing). A computing device may be or otherwise include a general-purpose computing device and/or a dedicated computing device configured to perform only certain limited functions.

The computer-readable data storage device 102 may be or otherwise include any type of computer-readable storage medium and may include not only a single tangible and/or non-transitory such medium or single type of such medium, but also a combination of one or more such media and/or types of such media. Examples of embodiments of the computer-readable data storage device 102 include, but are not limited to, one or more memories, hard drives, optical discs (such as CDs or DVDs), magnetic discs, magnetic tape drives, and other types of computer-readable data storage devices. The computer-readable data storage device 102 may be physically part of, or otherwise accessible by, the computing device 100, and may store the above-mentioned computer-readable instructions (e.g., software) and/or computer-readable data (i.e., information that may or may not be executable).

The computing device 100 may also include a user input/output interface 103 for receiving input from a user (e.g., via a keyboard, mouse, touch screen, an audio microphone, camera, and/or remote control) and/or for providing output to the user (e.g., via a touch screen or other display device, an audio speaker or piezoelectric element, an indicator light, a printer, etc.).

The computing device 100 may further include a communication input/output interface 104 for communicating with other devices via wire and/or wirelessly. Such communication with other devices may be direct or it may be indirect via a wired and/or wireless network.

Figure 2:
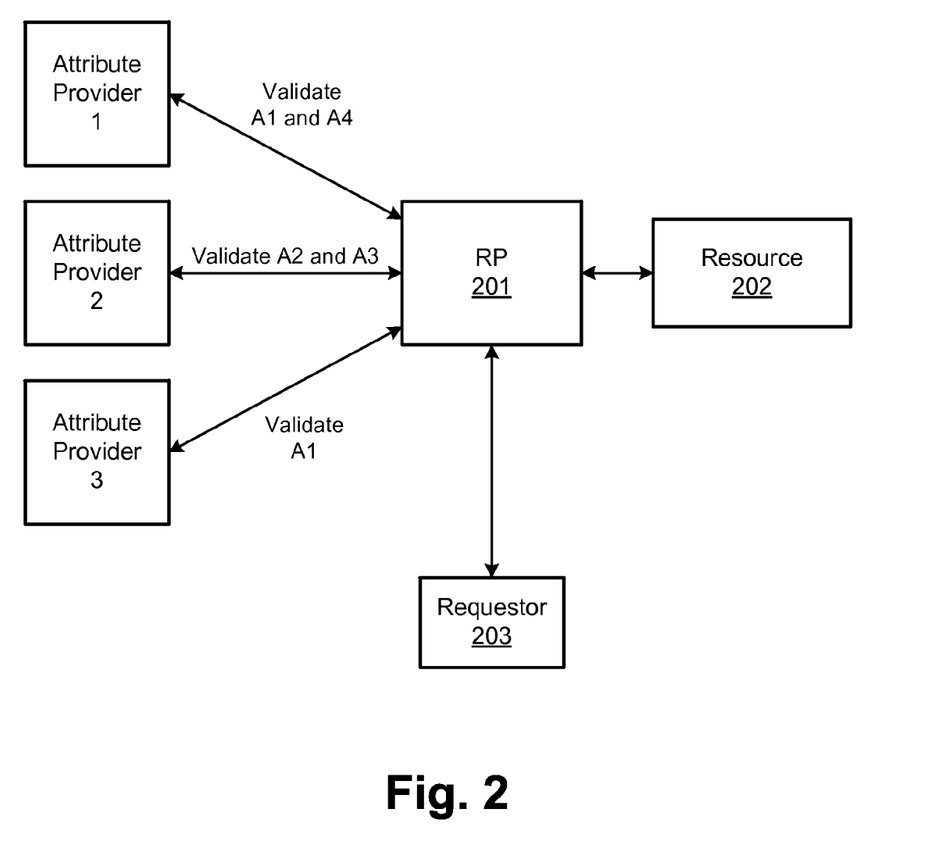
FIG. 2 is a block diagram showing an example an identity ecosystem in accordance with one or more aspects as described herein.

FIG. 2 is a block diagram showing an example of at least a portion of an identity ecosystem. In this example, the identity ecosystem includes a plurality of potential requesting parties (e.g., RP 201), each controlling access to a respective protected resource (e.g., resource 202), a plurality of requestors, such as users (e.g., requestor 203), and a plurality of attribute providers (e.g., attribute provider 1, attribute provider 2, and attribute provider 3). While only a single RP 201, a single resource 202, a single requestor 203, and three attribute sources are explicitly illustrated in FIG. 2, it will be understood that the identity ecosystem may include any number of each of these entities. Any of the entities 201, 202, 203, and/or the attribute providers may be or otherwise include one or more computing devices, such as but not limited to the example computing device described in connection with FIG. 1. Any of the entities of FIG. 2 may communicate directly or indirectly with each other, such as via one or more networks and/or communication links. The one or more networks and/or communication links may be wired and/or wireless.

The attribute providers 1-3 of FIG. 2 may each be any type of entity that is capable of providing one or more attributes to a relying party. For instance, each of the attribute providers may be or otherwise include an IDsP or a service provider to an IDsP. Each of the attribute providers 1-3 may store one or more attributes for one or more users. The set of attributes stored by each of the attribute providers 1-3 may be overlapping or non-overlapping, and may or may not be unique from each other. Each of the attribute providers 1-3 may furthermore present a given attribute at a given assurance level, such as a given LoA. Even where two or more of the attribute providers 1-3 store the same attribute for the same user, those two or more attribute providers 1-3 may or may not present that attribute at the same assurance level. For example, an internet service provider may provider a user address at a lower level of assurance than a bank, because the bank may have verified the user address against a driver's license or piece of physical mail, whereas the internet service provider may be relying on the user self-certifying the address as being valid.

The RP 201 may be any type of requesting party entity that may desire authentication of the requestor 203 before providing the requestor 203 with access to resource 202. To do so, the RP 201 may obtain one or more attributes from one or more of the attribute providers 1-3, at one or more assurance levels. As discussed above, not all attribute providers are necessarily fully reliable as to all attributes. Therefore, it may be desirable for the RP 201 to obtain the same attribute from more than one of the attribute providers 1-3.

Figure 3:
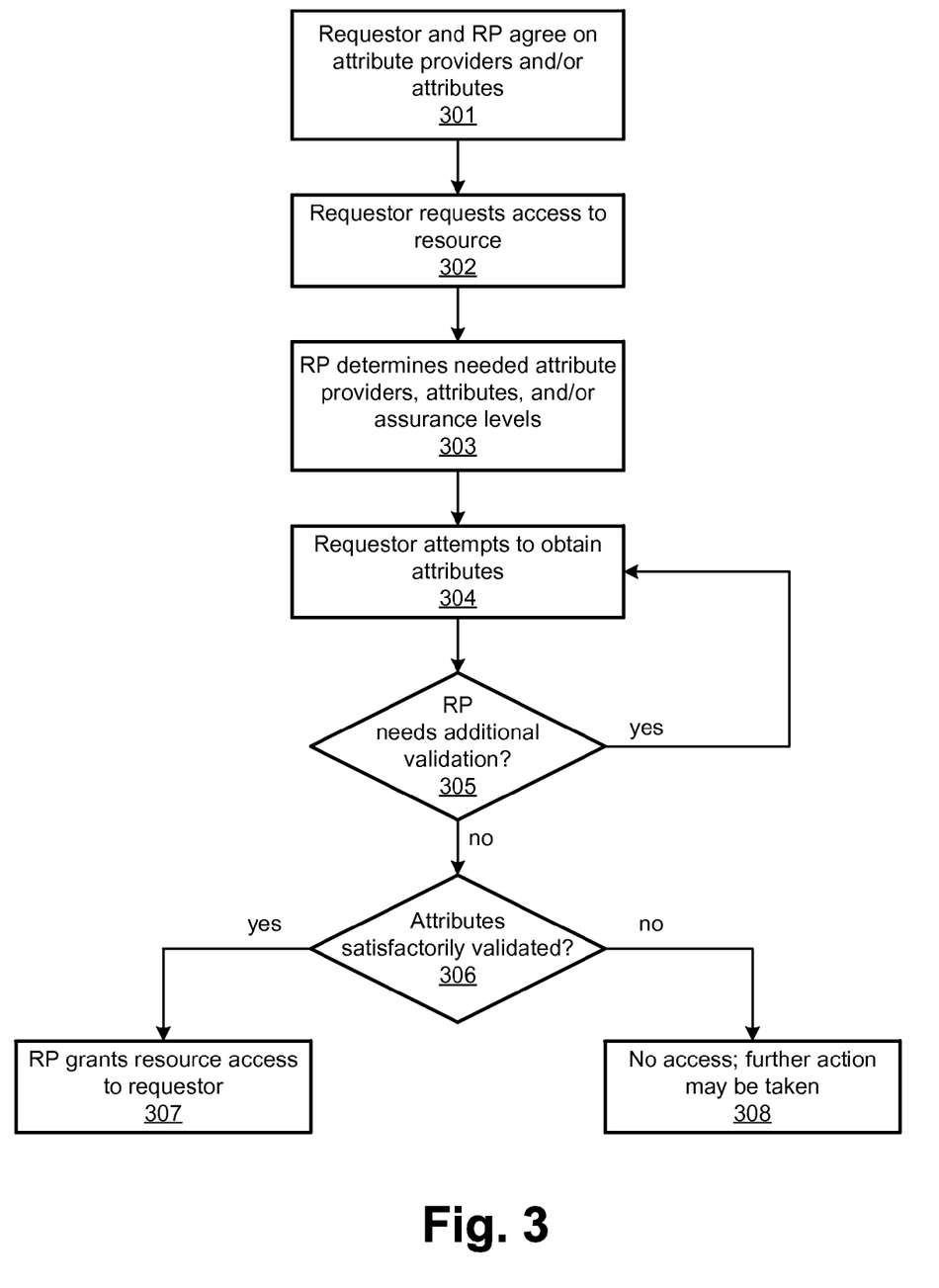
FIG. 3 is a flow chart showing illustrative steps that may be performed in accordance with one or more aspects as described herein.

An example of how the identity ecosystem may operate is now described in connection with FIG. 3. At step 301 of FIG. 3, requestor 203 and RP 201 may agree to one or more attribute providers and/or one or more attributes to be used for future transactions. For example, requestor 203 may indicate to RP 201 that attribute providers 1-3 are appropriate for obtaining certain attributes. Additionally or alternatively, RP 201 may offer to requestor 203 certain attribute providers that may are acceptable to RP 201, and requestor 203 may select from those offered attribute providers. Step 301 may be performed at any time, such as during initial account creation with RP 201 and/or at any time thereafter.

At step 302, requestor 203 would like access to resource 202, and thus may initiate communications with RP 201, such as by logging in with a server and/or website of RP 201 and/or by making an explicit request for resource 202. Step 302 may be performed immediately after (or as part of) step 301, or step 302 may be performed later such as during a completely separate transaction.

Next, at step 303, RP 201 may determine which attributes are needed, at which assurance levels, and/or from which attribute providers the attributes should be obtained. This may have been partially or fully determined at step 301, and/or this may be partially or fully determined dynamically in response to the request from requestor 203 at step 302. Moreover, the attributes and/or their respective assurance levels may depend upon the context of the requested resource and/or the context of the transaction in general. Examples of context include when account access is attempted within a predetermined time from two disparate geographic locations. Stated differently, one would not expect the same user to attempt to access an account from Canada at an initial time, and then from France only 30 minutes later. In the present example, assume that RP 201 has determined that it requires certain attributes of requestor 203, which will be arbitrarily named herein as attributes A1, A2, A3, and A4. A minimum assurance level may also be determined by RP 201 for each of attributes A1-A4.

Next, at step 304, RP 201 may attempt to obtain the attributes at the desired assurance levels, in accordance with a authorization engine of the RP 201. The authorization engine of an RP determines necessary levels of assurance for each attribute. At steps 301 and/or 303, RP 201 may have already pre-determined which attribute providers are most likely able to provide the needed attributes at the needed assurance levels. Additionally or alternatively, the attribute providers, attributes, and/or the needed assurance levels may partially or fully be dynamically determined at step 304. The user may alternatively specify the attribute providers, or the RP may select one or more attribute providers. In this example, RP 201 attempts to validate attributes A1 and A4 from attribute provider 1, and attributes A2 and A3 from attribute provider 2.

At step 305, based on the context of the interactions with the attribute providers and/or requestor 203, RP 201 may determine whether it requires additional validation to grant access to resource 202. For instance, RP 201 may determine whether it needs to validate one or more of the attributes already validated, but at a higher assurance level than it has so far received. Additionally or alternatively, RP 201 may determine that a not-yet previously validated attribute now should be validated. Thus, the determination of step 305 may be performed dynamically based on the results of the validated attributes from step 304. If desired, such determinations at step 305 may be performed independently by RP 201 without necessarily requiring further input from requestor 203.

If it is determined at step 305 that such additional validation is needed and may be obtainable, then the process may move back to step 303 or step 304. For example, RP 201 may determine that, while attribute A1 was validated at step 304 by attribute provider 1, RP 201 needs to validate attribute A1 at a still higher assurance level, and that attribute provider 3 may be able to do so. Accordingly, RP 201 in this example may attempt to obtain attribute A1 from RP 201 at the desired assurance level. The loop between steps 304 and 305 (and possibly also include step 303) may be repeated as many times as needed to iteratively and dynamically obtain as sufficient validation as possible.

If, at step 305, it is determined that all of the attributes that could be validated, have in fact been validated, then the process may move to step 306. At step 306, RP 201 determines whether the desired attributes have in fact been validated at the desired assurance levels. If so, then at step 307, resource 202 may be released to requestor 203. If not, then at step 308, further action may be taken such as by providing an error message to requestor 203 and/or requesting further information from requestor 203.

Figure 4:
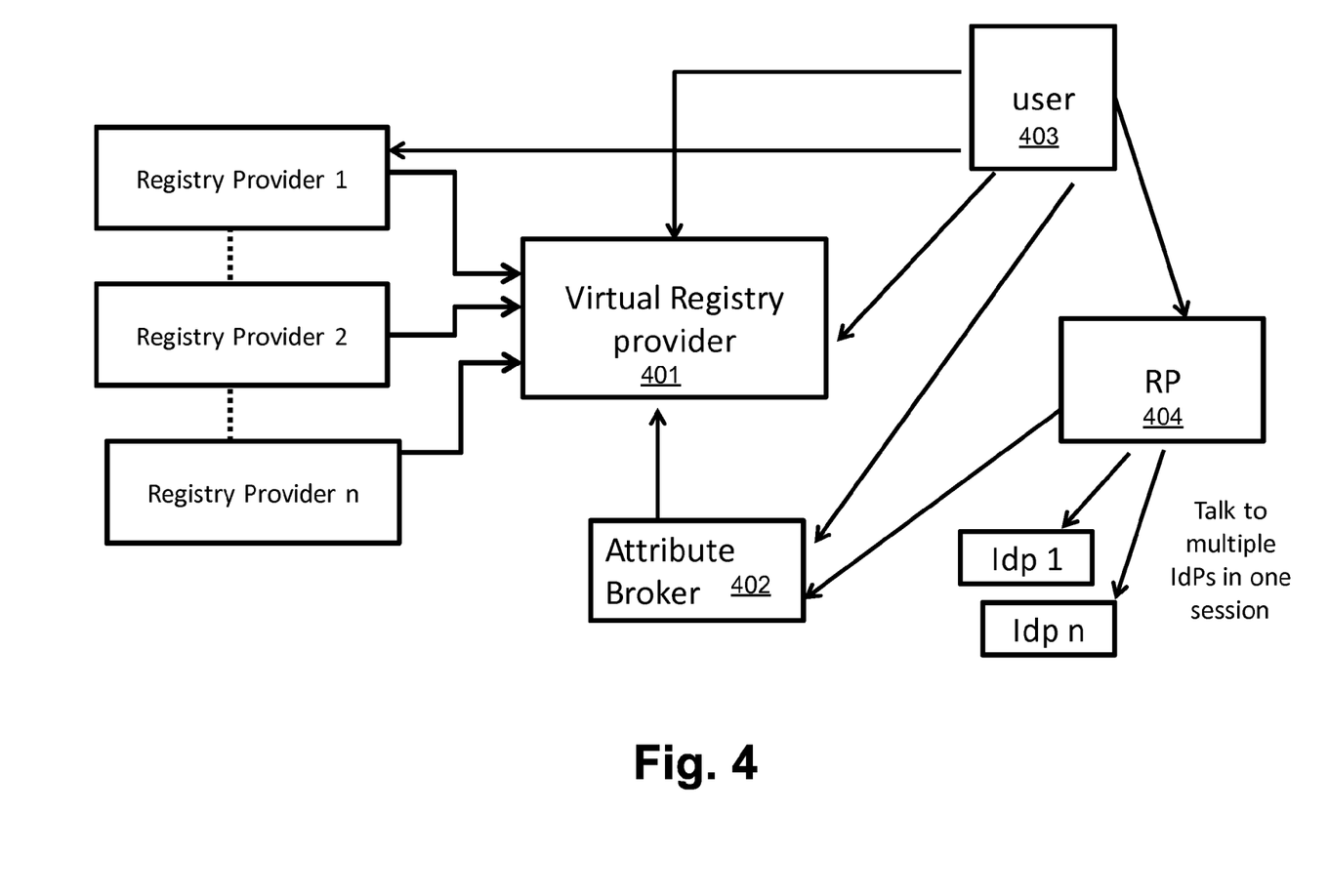
FIG. 4 is a block diagram showing another illustrative identity ecosystem in accordance with one or more aspects as described herein.

FIG. 4 is a block diagram showing another example of at least a portion of an identity ecosystem. In this example, the identity ecosystem includes one or more virtual registry providers (such as virtual registry provider 401), an attribute broker 402, a plurality of requestors (such as user 403), a plurality of potential relying parties (e.g., RP 404), one or more attribute providers (in this example, identity service providers IdP 1 through IdP n, where n is any whole number), and one or more registry providers (in this example, registry providers 1 through n, where n is any whole number that may or may not be the same as the number of IdPs in the identity ecosystem).

While only a single virtual registry provider 401, a single attribute broker 402, a single user 403, a single RP 404, two IdPs, and three registry providers are explicitly illustrated in FIG. 4, it will be understood that the identity ecosystem may include any number of each of these entities. Any of the entities 401, 402, 403, 404, the IdPs 1-n, and/or the registry providers 1-n may be or otherwise include one or more computing devices, such as but not limited to the example computing device described in connection with FIG. 1. Any of the entities in FIG. 4 may communicate directly or indirectly with each other, such as via one or more networks and/or communication links. The one or more networks and/or communication links may be wired and/or wireless.

Thus far in the present description, it has been assumed that the RP, attribute providers, and the user have the ability to discover attribute providers and information appropriate for an RP to validate attributes in its policy engine before it can release a resource. As will be described by way of example below, these entities (in either of the examples of FIG. 2 or FIG. 4) may utilize a registry provided by a virtual registry provider to accomplish these functions. Such a registry may potentially solve many problems that have not been addressed before. For example, the registry may enable an RP to interact with multiple attribute providers even during the same validation session, and may allow a RP to establish a relationship with an IDP on an ad-hoc or as-needed basis. The registry may further allow for the establishment of an echo system where an attribute broker can operate and charge for its services, e.g., similar to an online yellow pages directory, where a user can look for names for free but gets charged if the user needs to obtain a phone number.

Figure 5:
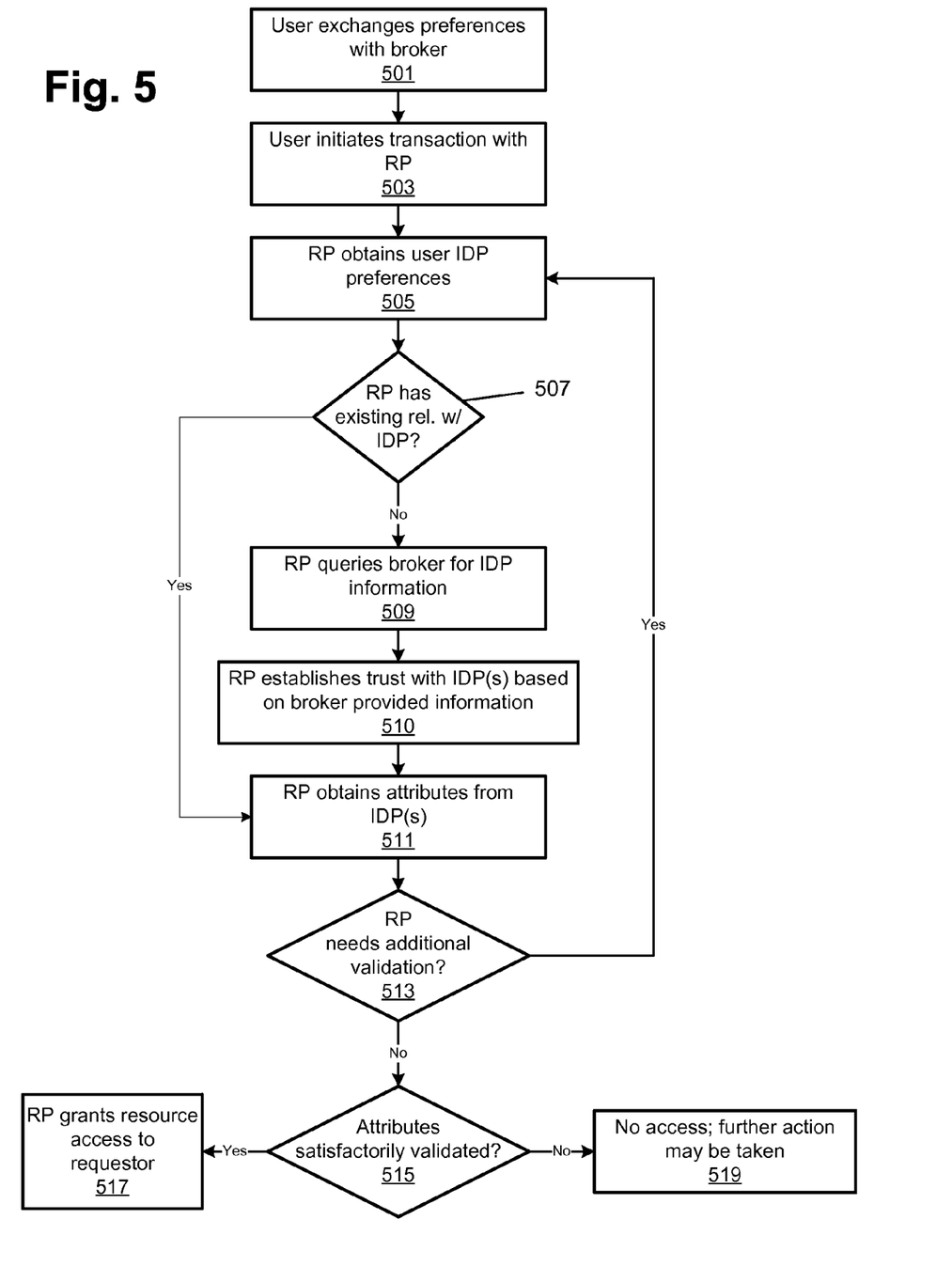
FIG. 5 is another flow chart showing illustrative steps that may be performed in accordance with one or more aspects as described herein It is noted that one or more of the drawings may not necessarily be drawn to scale.

FIG. 5 is a flowchart showing example steps that may be performed by an identity ecosystem such as the one shown by way of example in FIG. 4. The method of FIG. 5, e.g., may be used on demand by a relying party to establish a trusted relationship with an IDP to effect a transaction on behalf of a user/requestor. In step 501, an IDP (or multiple IDPs) provide their public credentials to a broker 402 for inclusion in the broker's registry of IDPs. The public credentials may include, in one example, a public key or public certificate in a PKI infrastructure. The public credentials may further include a policy of the IDP, e.g., specifying the limits of the IDP's liability, which attributes the IDP can authenticate, the level(s) of assurance the IDP can provide, and the like. Also in step 501, one or more users may optionally also establish an account with broker 402. Each user's account may specify the IDPs that the user uses for one or more attributes and identity authentication.

In step 503 the user may initiate a transaction with a relying party 404. Either the relying party or the user may indicate to the other that they use broker 402 for attribute authentication. In step 505, RP 404 queries the user (or broker 402) for the user's IDP preferences. RP 404 determines in step 507 whether RP 404 has an existing relationship with the user's preferred IDP(s),.

In step 509, RP 404 queries broker 402 for contact and authentication information for the identified IDP(s). In one illustrative embodiment the contact and authentication information may include a public key or PKI certification of the IDP(s), and may further include the IDP's policy identifying conditions of the IDP to engage in an OAuth-based (or other technology-based) session. In step 510 the relying party establishes a trust relationship with the one or more IDPs identified by the user preferences. Establishing the trust relationship may include exchanging signed PKI certificates (in a PKI model) or exchanging other information as specified by OAuth or other authentication model in use, such that each of the RP and the IDP have authenticated the other using information obtained from a neutral third party as well as from each other.

In step 511 RP 404 contacts the identified IDP(s) to obtain or confirm user attributes with a level of assurance provided by the IDP. Based on the received information, in steps 513-519, RP may perform similar actions as described with respect to FIG. 3, steps 305-308.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A method, comprising:
   receiving, by a computing device, a request from a user for access to a protected computer resource on a designated computer;
   determining, by the computing device, a plurality of user attributes needed to access the protected computer resource;
   authenticating, by the computing device, a first attribute of the plurality of attributes based on a first level of assurance received from a first computer of the first identity service provider;
   authenticating, by the computing device, a second attribute of the plurality of attributes based on a second level of assurance received from a second computer of a second identity service provider;
   when the computing device requires a greater degree of assurance than the first level of assurance, authenticating, by the computing device, the first attribute based on a third level of assurance received from a third computer of a third identity service provider, wherein the third level of assurance has a higher assurance level;
   when the plurality of attributes are each authenticated at their respective required levels of assurance, granting access to the protected computer resource; and
   when the plurality of attributes are not all authenticated at their respective required levels of assurance, denying access to the protected computer resource.

2. The method of claim 1, wherein the level of assurance received from the first identity service provider computer is a different level of assurance from the level of assurance received from the second identity service provider computer.

3. The method of claim 1, wherein the first identity service provider and the second identity service provider are independent entities.

4. The method of claim 1, further comprising:
   determining, by the computing device, a context of the request; and
   altering the respective required levels of assurances based on the determined context of the request.

5. The method of claim 1, further comprising using OAuth-based authentication to perform each authentication.

6. The method of claim 1, wherein the first attribute and the second attribute are the same attribute.

7. The method of claim 1, wherein the first identity service provider and the second identity service provider are both selected by either the user or the computing device.

8. The method of claim 1, wherein the first identity service provider is selected by the user, and the second identity service provider is selected by the computing device.

9. The method of claim 1, wherein the first identity service provider and the second identity service provider are agreed upon between the user and the computing device.

10. One or more tangible non-transitory computer readable media storing computer executable instructions that, when executed by a computing device, perform a method comprising:
    receiving a request from a user for access to a protected computer resource;
    determining a plurality of user attributes needed to access the protected computer resource;
    authenticating a first attribute of the plurality of attributes based on a first level of assurance received from a first computer of a first identity service provider;
    authenticating the first attribute of the plurality of attributes based on a second level of assurance received from a second computer of a second identity service provider; and
    determining an elevated level of assurance for the first attribute from the first and second levels of assurance, wherein the elevated level of assurance is greater than the first and second levels of assurance.

11. The computer readable media of claim 10, wherein the level of assurance received from the first identity service provider computer is a different level of assurance from the level of assurance received from the second identity service provider computer.

12. The computer readable media of claim 10, wherein the first identity service provider and the second identity service provider are independent entities.

13. The computer readable media of claim 10, further comprising:
    when the plurality of attributes are each authenticated at their respective required levels of assurance, granting access to the protected computer resource; and
    when the plurality of attributes are not all authenticated at their respective required levels of assurance, denying access to the protected computer resource.

14. The computer readable media of claim 10, further comprising using OAuth-based authentication to perform each authentication.

15. The computer readable media of claim 10, wherein the first attribute and the second attribute are the same attribute.

16. A system, comprising:
    a processor; and
    memory storing computer executable instructions that, when executed by the system, perform a method comprising:
        receiving a request from a user for access to a protected computer resource;
        determining a plurality of user attributes and respective required levels of assurance needed to access the protected computer resource;
        determining a context of the request based on different access attempts for the protected computer resource;
        altering the respective required levels of assurances from the determined context of the request;
        authenticating a first attribute of the plurality of attributes based on a first level of assurance received from a first computer of a first identity service provider; and
        authenticating a second attribute of the plurality of attributes based on a second level of assurance received from a second computer of a second identity service provider.

17. The system of claim 16, wherein the level of assurance received from the first identity service provider computer is a different level of assurance from the level of assurance received from the second identity service provider computer.

18. The system of claim 16, wherein the first identity service provider and the second identity service provider are independent entities.

19. The system of claim 16, further comprising:
    when the plurality of attributes are each authenticated at their respective required levels of assurance, granting access to the protected computer resource; and when the plurality of attributes are not all authenticated at their respective required levels of assurance, denying access to the protected computer resource.

20. The system of claim 16, further comprising using OAuth-based authentication to perform each authentication.

21. The system of claim 16, wherein the authenticating the second attribute is performed through the first identity service provider to the second identity service provider.

* * * * *